US008631277B2

(12) United States Patent
Swan et al.

(10) Patent No.: US 8,631,277 B2
(45) Date of Patent: Jan. 14, 2014

(54) PROVIDING TRANSPARENT FAILOVER IN A FILE SYSTEM

(75) Inventors: Paul R. Swan, Sammamish, WA (US); Mathew George, Bellevue, WA (US); David M. Kruse, Kirkland, WA (US); Roopesh C. Battepati, Sammamish, WA (US); Michael C. Johnson, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 284 days.

(21) Appl. No.: 12/964,749

(22) Filed: Dec. 10, 2010

(65) Prior Publication Data

US 2012/0151249 A1 Jun. 14, 2012

(51) Int. Cl.
*G06F 11/00* (2006.01)

(52) U.S. Cl.
USPC ............................................. 714/15; 714/10

(58) Field of Classification Search
None
See application file for complete search history.

(56) References Cited

U.S. PATENT DOCUMENTS

| | | | |
|---|---|---|---|
| 4,399,504 | A | 8/1983 | Obermarck |
| 4,780,821 | A | 10/1988 | Crossley |
| 4,791,566 | A | 12/1988 | Sudama |
| 4,825,354 | A | 4/1989 | Agrawal |
| 4,887,204 | A | 12/1989 | Johnson |
| 4,891,785 | A | 1/1990 | Donohoo |
| 4,914,570 | A | 4/1990 | Peacock |
| 5,008,853 | A | 4/1991 | Bly |
| 5,109,519 | A | 4/1992 | Zimmet |
| 5,113,519 | A | 5/1992 | Johnson |
| 5,202,971 | A | 4/1993 | Henson |
| 5,218,696 | A | 6/1993 | Baird et al. |
| 5,261,051 | A | 11/1993 | Masden et al. |
| 5,265,261 | A | 11/1993 | Rubin et al. |
| 5,313,646 | A | 5/1994 | Hendricks et al. |
| 5,349,642 | A | 9/1994 | Kingdon |
| 5,375,207 | A | 12/1994 | Blakely et al. |
| 5,410,697 | A | 4/1995 | Baird |
| 5,437,013 | A | 7/1995 | Rubin et al. |

(Continued)

FOREIGN PATENT DOCUMENTS

| | | |
|---|---|---|
| EP | 1 259 045 A2 | 11/2002 |
| EP | 1 259 045 A3 | 11/2002 |

(Continued)

OTHER PUBLICATIONS

Microsoft Computer Dictionary, Fifth Edition, 2002, p. 486.*
Danilo Almeida, FIFS: A Framework for Implementing User-Mode File Systems in Windows NT, Proceedings of the 3rd USENIX Windows NT Symposium, Jul. 12-13, 1999.*
Aboba et al., Extensible Authentication Protocol (EAP) [online], See Fast Connect, RFC 3748, Jun. 2004, [Retrieved Mar. 3, 2007], Retrieved from: http://www.ietf.org/rfc/rfc3748.txt?number=3748.
Alvisi et al., "Low-Overhead Protocols for Fault-Tolerant File Sharing"; In Proceedings of the IEEE 18th International Conference on Distributed Computing Systems; 1998; 10 pgs.

(Continued)

*Primary Examiner* — Michael Maskulinski
(74) *Attorney, Agent, or Firm* — Merchant & Gould P.C.

(57) ABSTRACT

A connection state system is described herein that allows a client to resume a connection with a server or a different replacement server by remotely storing client state information in association with a resume key. The system provides a resume key filter operating at the server that facilitates the storing of volatile server state information. The state information can include information such as oplocks, leases granted to a client, and in-flight operations on a file handle. The resume key filter driver sits above the file system, which allows multiple file access protocols to use the filter. Upon a failover event, such as a server going down or losing connectivity to a client, the system can bring up another server or the same server and reestablish state for file handles held by various clients using the resume key filter.

20 Claims, 4 Drawing Sheets

100
Connection State System
110 State Collection Component
120 State Storing Component
130 State Data Store
140 Resume Detection Component
150 State Retrieval Component
160 State Restoration Component
170 Blackout Enforcement Component
180 Resource Suspension Component

(56) References Cited

U.S. PATENT DOCUMENTS 5,452,447 A 9/1995 Nelson
5,491,752 A 2/1996 Kaufman et al.
5,493,728 A 2/1996 Solton
5,513,314 A 4/1996 Kandasamy
5,522,042 A 5/1996 Fee et al.
5,535,375 A 7/1996 Eshel et al.
5,560,008 A 9/1996 Johnson et al.
5,588,117 A 12/1996 Karp et al.
5,628,005 A 5/1997 Hurvig
5,764,887 A 6/1998 Kells et al.
5,826,027 A 10/1998 Pedersen et al.
5,931,913 A 8/1999 Meriwether et al.
5,933,602 A 8/1999 Grover
5,978,802 A 11/1999 Hurvig
6,085,247 A 7/2000 Parsons et al.
6,092,199 A 7/2000 Dutcher
6,125,122 A 9/2000 Favichia et al.
6,131,125 A 10/2000 Rostoker et al.
6,208,952 B1 3/2001 Goertzel
6,219,799 B1 4/2001 Kandasamy
6,243,862 B1 6/2001 Lebow
6,247,139 B1 6/2001 Walker et al.
6,275,953 B1 * 8/2001 Vahalia et al. .................. 714/11
6,317,844 B1 11/2001 Kleiman
6,324,581 B1 11/2001 Xu et al.
6,349,250 B1 2/2002 Hart et al.
6,349,350 B1 2/2002 Hathorn et al.
6,401,123 B1 6/2002 Shields et al.
6,430,691 B1 8/2002 Di Santo et al.
6,438,691 B1 8/2002 Mao
6,452,903 B1 9/2002 Peck et al.
6,453,354 B1 9/2002 Jiang et al.
6,640,226 B1 10/2003 Shringeri et al.
6,658,476 B1 12/2003 Van
6,829,473 B2 12/2004 Raman et al.
6,883,015 B1 * 4/2005 Geen et al. .................... 709/203
6,910,082 B1 6/2005 Marcotte
6,928,577 B2 8/2005 Moser et al.
7,020,651 B2 3/2006 Ripley
7,103,007 B2 9/2006 Natarajan et al.
7,111,035 B2 9/2006 McClellan et al.
7,111,060 B2 9/2006 Araujo et al.
7,197,535 B2 3/2007 Salesky et al.
7,243,132 B2 7/2007 Choi
7,290,141 B2 10/2007 Sengodan et al.
7,293,192 B2 11/2007 Allen et al.
7,318,102 B1 1/2008 Krause et al.
7,330,910 B2 2/2008 Young et al.
7,339,885 B2 3/2008 Ahrens et al.
7,380,080 B2 5/2008 Hughes
7,380,155 B2 5/2008 Fung et al.
7,383,463 B2 * 6/2008 Hayden et al. ............... 714/4.11
7,386,889 B2 6/2008 Shay
7,388,866 B2 6/2008 Fan et al.
7,409,420 B2 8/2008 Pullara et al.
7,421,502 B2 9/2008 Czap et al.
7,434,087 B1 10/2008 Singh
7,444,536 B1 10/2008 Jairath
7,451,221 B2 11/2008 Basani et al.
7,453,879 B1 11/2008 Lo
7,457,722 B1 11/2008 Shain et al.
7,509,407 B2 3/2009 Miller et al.
7,526,658 B1 4/2009 He et al.
7,526,668 B2 4/2009 Shitomi et al.
7,539,722 B2 5/2009 Mohamed et al.
7,562,129 B1 7/2009 Lee et al.
7,664,991 B1 2/2010 Gunda et al.
7,673,066 B2 3/2010 Zheng
7,702,745 B2 4/2010 Lin et al.
8,275,815 B2 9/2012 Aronovich et al.
2002/0019874 A1 2/2002 Borr
2002/0073211 A1 6/2002 Lin et al.
2002/0083130 A1 6/2002 Shimada et al.
2002/0152315 A1 10/2002 Kagan et al.
2002/0161980 A1 10/2002 Nishikawa
2003/0018927 A1 1/2003 Gadir et al.
2003/0056069 A1 3/2003 Cabrera et al.
2003/0058277 A1 3/2003 Bowman-Amuah
2003/0093643 A1 5/2003 Britt, Jr.
2003/0093678 A1 5/2003 Bowe et al.
2003/0112754 A1 6/2003 Ramani et al.
2003/0115341 A1 6/2003 Sinha et al.
2003/0126195 A1 7/2003 Reynolds et al.
2003/0140129 A1 7/2003 Livnat et al.
2003/0169859 A1 9/2003 Strathmeyer et al.
2003/0182282 A1 9/2003 Ripley
2004/0003210 A1 1/2004 Duale et al.
2004/0003241 A1 1/2004 Sengodan et al.
2004/0018829 A1 1/2004 Raman et al.
2004/0019660 A1 1/2004 E. et al.
2004/0032876 A1 2/2004 Garg et al.
2004/0044930 A1 3/2004 Keller et al.
2004/0103342 A1 5/2004 Moser et al.
2004/0136325 A1 7/2004 Dobric et al.
2004/0160909 A1 8/2004 Sheynblat
2004/0215794 A1 10/2004 Lauer
2004/0225952 A1 11/2004 Brown et al.
2004/0260748 A1 12/2004 Springer et al.
2004/0267932 A1 12/2004 Voellm et al.
2004/0268118 A1 12/2004 Bazan Bejarano
2005/0010670 A1 1/2005 Greschler et al.
2005/0015511 A1 1/2005 Izmailov et al.
2005/0015747 A1 1/2005 Zatloukal et al.
2005/0021832 A1 1/2005 Bennett et al.
2005/0038828 A1 2/2005 Kaluskar et al.
2005/0041686 A1 2/2005 Roy et al.
2005/0055345 A1 3/2005 Ripley
2005/0060442 A1 3/2005 Beverly et al.
2005/0091212 A1 4/2005 Mohamed et al.
2005/0102537 A1 5/2005 Zheng
2005/0111030 A1 5/2005 Berkema et al.
2005/0114670 A1 5/2005 Bowe et al.
2005/0125378 A1 6/2005 Kawada
2005/0129045 A1 6/2005 Machulsky et al.
2005/0131832 A1 6/2005 Fransdonk
2005/0132077 A1 6/2005 Biran et al.
2005/0138528 A1 6/2005 Ameigeiras et al.
2005/0149817 A1 7/2005 Biran et al.
2005/0177635 A1 8/2005 Schmidt et al.
2005/0182850 A1 8/2005 Kohno
2005/0198113 A1 9/2005 Mohamed et al.
2005/0198247 A1 9/2005 Perry et al.
2005/0198359 A1 9/2005 Basani et al.
2005/0198380 A1 9/2005 Panasyuk et al.
2005/0223014 A1 10/2005 Sharma et al.
2005/0228884 A1 10/2005 Hawley
2005/0246803 A1 11/2005 Spencer
2005/0248803 A1 11/2005 Ohara
2005/0251448 A1 11/2005 Gropper
2005/0257022 A1 11/2005 Hughes
2005/0258022 A1 11/2005 Horton et al.
2005/0262084 A1 11/2005 Tomita
2005/0262103 A1 11/2005 Stakutis et al.
2006/0031519 A1 2/2006 Helliwell et al.
2006/0041698 A1 2/2006 Han et al.
2006/0045005 A1 3/2006 Blackmore et al.
2006/0047818 A1 3/2006 Kruglick et al.
2006/0059118 A1 3/2006 Byrd et al.
2006/0080443 A1 4/2006 Kruglick et al.
2006/0080568 A1 4/2006 Subbaraman et al.
2006/0085328 A1 4/2006 Cohen et al.
2006/0095382 A1 5/2006 Mahlbacher
2006/0130107 A1 6/2006 Gonder et al.
2006/0168262 A1 7/2006 Frazer
2006/0206705 A1 9/2006 Khosravi
2006/0271692 A1 11/2006 Kruse et al.
2006/0271697 A1 11/2006 Kruse et al.
2006/0281525 A1 12/2006 Borissov
2007/0150558 A1 6/2007 Teodosiu et al.
2007/0171793 A1 7/2007 Mesut et al.
2007/0192326 A1 8/2007 Angal et al.
2007/0220155 A1 9/2007 Nalla et al.
2008/0151885 A1 6/2008 Horn et al.
2008/0172397 A1 7/2008 Maeda et al.

(56) References Cited

U.S. PATENT DOCUMENTS

| | | | | |
|---|---|---|---|---|
| 2009/0077097 | A1 | 3/2009 | Lacapra et al. | |
| 2009/0138615 | A1 | 5/2009 | Cristallo et al. | |
| 2009/0172085 | A1 | 7/2009 | Arthursson | |
| 2009/0319661 | A1 | 12/2009 | Shiozawa et al. | |
| 2009/0327798 | A1 | 12/2009 | D'Amato et al. | |
| 2010/0042715 | A1 | 2/2010 | Tham et al. | |
| 2010/0161855 | A1 | 6/2010 | Mohamed et al. | |
| 2010/0185704 | A1 | 7/2010 | George et al. | |
| 2011/0040826 | A1* | 2/2011 | Chadzelek et al. | 709/203 |
| 2013/0007180 | A1 | 1/2013 | Talpey et al. | |
| 2013/0007518 | A1 | 1/2013 | George et al. | |
| 2013/0066941 | A1 | 3/2013 | Kruse et al. | |
| 2013/0067095 | A1 | 3/2013 | Kruse et al. | |
| 2013/0091199 | A1 | 4/2013 | Kruse et al. | |
| 2013/0097211 | A1 | 4/2013 | Kruse et al. | |

FOREIGN PATENT DOCUMENTS

| | | |
|---|---|---|
| EP | 1 727 056 | 11/2006 |
| JP | 60-019341 | 1/1985 |
| JP | 62-297927 | 12/1987 |
| JP | 63-061148 | 3/1988 |
| JP | 63-205747 | 8/1988 |
| JP | 64-061148 | 3/1989 |
| JP | 02-101847 | 4/1990 |
| JP | 03-048558 | 3/1991 |
| JP | 03-074745 | 3/1991 |
| JP | 04-172039 | 6/1992 |
| JP | 04-229746 | 8/1992 |
| JP | 05-089048 | 4/1993 |
| JP | 05-143488 | 6/1993 |
| JP | 06-075890 | 3/1994 |
| JP | 63-256165 | 10/1998 |
| JP | 10-313342 | 11/1998 |
| JP | 11-055314 | 2/1999 |
| JP | 2001-094613 | 4/2001 |
| JP | 2003-016766 | 1/2003 |
| JP | 2003-069610 | 3/2003 |
| JP | 2003-281091 | 3/2003 |
| JP | 2003-125022 | 4/2003 |
| JP | 2004-005427 | 1/2004 |
| JP | 2004-229143 | 8/2004 |
| JP | 2005-322016 | 11/2005 |
| JP | 2007-49755 | 2/2007 |
| JP | 3967758 | 6/2007 |
| KR | 10-1994-0001700 | 3/1994 |
| KR | 10-0860152 | 9/2008 |
| WO | WO 03/096646 | 11/2003 |

OTHER PUBLICATIONS

ANSI, Financial Institution Message Authentication (Wholesale), Financial Services Technical Publication, ANSI X9.9-1994, Aug. 15, 1986; 38 pgs.

Asokan et al., Server Supported Signatures, Journal of Computer Security, Fall 1997; 13 pgs.

Bell Labs, Plan 9 default Fossil File System [online], [Retrieved Sep. 17, 2007], Retrieved from: http://plan9.bell-labs.com/magic/man2html/4/fossil; 4 pgs.

Bensaou et al., Credit-Based Fair Queueing (CBFQ): A Simple Service-Scheduling Algorithm for Packet-Switched Networks, IEEE/ACM Transactions on Networking, vol. 9, No. 5, Oct. 2001.

CIFS http://msdn.microsoft.com/library/default.asp?url= /library/en-us/cifs/protocol/cifs.asp, 2 pgs.

CIFS Oplock File Locking, MSDN, [Retrieved Jan. 7, 2008], Retrieved from: http://msdn2.microsoft.com/en-us/library/aa302210.aspx; 3 pgs.

CIFS or Public SMB Information on Common Internet File System http://support.microsoft.com/default.aspx?scid=kb;en-us;199072; 2 pgs.

Dehaese, G., *The ISO 9660 File System* [online], May 1995, [Retrieved Sep. 14, 2007], Retrieved from: http://users.pandora.be/it3.consultants.bvba/handouts/IS09960.html.

Digital Equipment Corporation, *Introduction to RSX-11M* online, Order No. AA-L763B-TC, RSX-11M Version 4.2, First Printing Sep. 1979, Revised Nov. 1981 and Jul. 1985, [Retrieved Aug. 9, 2007], Retrieved from: http://www.computer.museum.uq.edu.au/RSX-11%20Manuals.html; 65 pgs.

ECMA, Volume and File Structure for Write-Once and Rewritable Media using Non-Sequential Recording for Information Interchange 3rd Edition [online], ECMA-167, Jun. 1997, Retrieved Aug. 9, 2007, Retrieved from: http://www.ecma-international.org/publications/files/ECMA-ST/Ecma-167.pdf; 150 pgs.

French, Steven M., "A New Network File System is Born: Comparison of SMB2, CIFS, and NFS", retrieved Mar. 23, 2011, 14 pgs.

Gifford et al., *The Cedar File System*, Communications of the ACM, vol. 31, No. 3, Mar. 1998; 11 pgs.

Greenberg et al., "NFILE—A File Access Protocol"; Network Working Group; RFC 1037; Dec. 1997; 43 pgs.

Gu et al., "SABUL: A High Performance Data Transfer Protocol"; IEEE Communications Letters; 2001; 11 pgs.

Hartman; "The Zebra Striped Network File System"; Doctoral dissertation at the University of California at Berkeley; 1991; 159 pgs.

Hiltunen et al., "Implementing Integrated Fine-Grain Customizable QoS Using Cactus"; The 29th Annual International Symposium on Fault-Tolerant Computing (Fast Abstract); Madison, WI; 1999, 2 pgs.

Hitz et al., File System Design for an NFS File Server Appliance [online], Network Appliance, TR 3002, 1994, [Retrieved Aug. 9, 2007], Retrieved from: http://www.netapp.conn/library/tr/3002.pdf; 13 pgs.

Hobbit, CIFS: Common Insecurities Fail Scrutiny [online], Avian Research, Jan. 1997, Retrieved from: http://web.textfiles.com/hacking/cifs.txt; 39 pgs.

IBM, IBM Personal Computer Seminar Proceedings, vol. 2, No. 5, Sep. 1984; 13 pgs.

International Organization for Standardization, Banking—Approved algorithms for message authentication—, ISO 8731-1, Jun. 1, 1987; 4 pgs.

John H. Samba Team Terpstra, "Chapter 32. High Availability Part III. Advanced Configuration", retrieved Mar. 22, 2011, 6 pages.

Kent et al., IP Authentication Header [online], RFC 2402, Nov. 1998, [Retrieved Aug. 9, 2007], Retrieved from: http://tools.ietf.org/html/rfc2402, 20 pgs.

Kent et al., Security Architecture for the Internet Protocol [online], RFC 2401, Nov. 1998, [Retrieved Jun. 6, 2007], Retrieved from: http://www.ietf.rg/rfc/rfc2401.txt? number=2401, 62 pgs.

Klima, "Tunnels in Hash Functions: MD5 Collisions Within a Minute", Version 1, Mar. 2006, Version Apr. 2, 2006, Cryptology ePrint Archive, 17 pgs.

Krawczyk, "HMAC: Keyed-Hashing for Message Authentication", RFC-2104, Feb. 1997, http://www.jetf.org/rfc/rfc2104.txt, 10 pgs.

Leach et al., CIFS Logon and Pass Through Authentication Preliminary Draft [online], Jan. 3, 1997, 22 pgs.

Leach et al., CIFS/E Browser Protocol Preliminary Draft [online], Jan. 10, 1997, 33 pgs.

Leach et al., draft-leach-cifs-print-spec-00.txt, CFIS Printing Specification Preliminary Draft [online], Jan. 31, 1997; 30 pgs.

Leach et al., draft-leach-cifs-rap-spec-00.txt, CFIS Remote Administration Protocol Preliminary Draft online , Feb. 26, 1997; 39 pgs.

Leach, P. et a., "A Common Internet File System (CIFS/1.0) Protocol Preliminary Draft", draft-leach-cifs-v1-spec-02, Mar. 13, 1997, http://microsoft.com/mscorp/ip/protocols/BSTD/CIFS: 160 pgs.

Leach, P., Naik, D., A Common Internet File System (CIFS/1.0) Protocol Preliminary Draft [online], Dec. 19, 1997. Retrieved from: http://tools.ietf.org/html/draft-leach-cifs-v1-spec-01; 132 pgs.

LeGrow, "Maintenance—MSRPC Update (Version 11) and SMB Update (Version 3)"; cfr-users mailing list; http://list.nfr.com/mailman/listingfo/nfr-users; May 20, 2004; 2 pgs.

Linn, "Generic Security Service Application Program Interface, Version 2, Update 1", RFC 2743, Jan. 2000, http://www.ieft.org/rfc/rfc2743.txt, 90 pgs.

Loafman, Zach, "SMB1/SMB2; A BSD Perspective", retrieved Mar. 22, 2011, 35 pgs.

Morris, "Andrew: A Distributed Personal Computing Environment", Communications of the ACM, vol. 29, No. 3, Mar. 1986, New York, 20 pgs.

(56) References Cited

OTHER PUBLICATIONS

MS-SMB2—Preview: Server Message Block (SMB) Version 2 Protocol Specification, copyright 2010 Microsoft Corporation, 309 pgs.
Mullender, "A Distributed File Service Based on Optimistic Concurrency Control", Proceedings of the Tenth ACM Symposium on Operating Systems Principles, Dec. 1-4, 1985, Orcas Island, WA, 14 pgs.
Murphy, Origins and Development of TOPS-20 [online], © 1989, 1996, [Retrieved Aug. 9, 2007], Retrieved from: http://www.opost.com/dlm/tenex/hbook.html; 28 pgs.
National Bureau of Standards, *Computer Data Authentication*, Federal Information Processing Standards Publication 113, May 30, 1985; 9 pgs.
Pawlowski, Brian et al. "The NFS Version 4 Protocol" (Publication date not available), 20 pgs.
Periasamy, Anand Babu, "Next-Gen Linux File Systems: Change is the New Constant", retrieved Mar. 23, 2011, 4 pages.
Platform SDK: File Systems: Microsoft SMB Protocol and CIFS Protocol Overview http://msdn.microsoft.com/ library/default.asp?ur1=/library/ en-us/fileio/fs/ microsoft_smb_protocol_and_cifs_protocol_overview.asp; 1 pg.
Pranevich, "The Wonderful World of Linux 2.6"; 2005; 17 pgs.
Rivest, "The MD5 Message-Digest-Algorithm", RFC 1321, Apr. 1992, http://www.jetf.org/rfc/rfc2104.txt, 19 pgs.
Rubin, F., *Message Authentication Using Quadratic Residues* [online], Jan. 31, 1995, [Retrieved Sep. 14, 2007], Retrieved from: http://www.mastersoftware.biz/crypt002.htm; 6 pgs.
Samba Team, *The Samba Team are pleased to announce Samba1.9.18* [online], Jan. 7, 1998, [Retrieved Jan. 4, 2008], Retrieved from: http://de.samba.org/samba/history/samba1.9.18.html; 4 pgs.
Satran et al. *Internet Small Computer Systems Interface* (*iSCSI*) [online], RFC 3720, Apr. 2004, [Retrieved Mar. 3, 2007], Retrieved from: http://www.ietf.org/rfc/rfc3720.txt?number=3720; 67 pgs.
Satyanaryanan et al, "Scalable, Secure and Highly Available Distributed File Access", May 1990, 12 pgs.
Schneier, B., *Applied Cryptography Protocols, Algorithm and Source Code in C Second Edition*, John Wiley & Sons, Inc., © 1996; 788 pgs.
Shepler, S. et al., "Network File System (NFS) Version 4 Protocol", Network Working Group, Request for Comments: 3530, Apr. 2003, 275 pgs.
Shepler, S. et al., "NFS Version 4 Protocol", RFC 3010, Proceedings on the 2nd International System Administration and Networking Conference (SANE2000), Dec. 2000, 212 pgs.
Shepler, S., *NFS Version 4 Design Considerations* [online], RFC 2624, Jun. 1999, [Retrieved Jan. 4, 2008], Retrieved from: http://tools.ietf.org/html/rfc2624; 22 pgs.
SNIA, *Common Internet File System* (*CIFS*) *Technical Reference* [online], Mar. 1, 2002, Retrieved from: http://www.snia.org/tech_activities/CIFS/CIFS-TR-1p00_FINAL.pdf; 150 pgs.
Soules et al., *Metadata Efficiency in a Comprehensive Versioning File System*, May 2002; 33 pgs.
Srinivasan et al., Spritely NFS: Implementation and Performance of Cache-Consistency Protocols [online], May 1989, [Retrieved Jan. 4, 2008], Retrieved from: http://www.hpl.hp.com/techreports/Compaq-DEC/WRL-89-5.pdf; 35 pgs.
Szczerbina, "Novell's NetWare Core Protocol", Dr. Dobb's Journal, Nov. 1993, 17 pgs.
Talpey et al., "NFSv4 Session Extensions, draft-ietf-nfsv4-sess-01"; Internet Draft; The Internet Society; Feb. 2005; 70 pgs.
The Java CIFS Client Library [online], [Retrieved Jul. 13, 2007], Retrieved from: http://jcifs.samba.org/, 8 pgs.
The Open Group; Technical Standard; Protocols for X/Open PC lnterworking: SMB, Version 2; http://www.opengroup.org/onlinepubs/9697999099/toc.pdf; retrieved on Sep. 1, 1992; 534 pgs.
Tichy, W., RCS—A System for Version Control [online], Jan. 3, 1991, [Retrieved Aug. 6, 2007], Retrieved from: http://www.cs.purdue.edu/homes/trinkle/RCS/rcs.ps; 20 pgs.
TOPS-20 [online], Wikipedia, [Retrieved Mar. 4, 2007], Retrieved from: http://en.wikipedia.org/wiki/TOPS-20; 4 pgs.
Tridgell, "Inside Microsoft Networking", Jun. 25, 1998, 6 pgs.
U.S. Official Action dated Feb. 2, 2010 cited in U.S. Appl. No. 11/182,989, 18 pgs.
U.S. Official Action dated Jan. 25, 2010 cited in U.S. Appl. No. 11/182,251, 20 pgs.
U.S. Official Action dated Jul. 23, 2010 cited in U.S. Appl. No. 11/182,989, 17 pgs.
U.S. Official Action dated Jul. 30, 2010 cited in U.S. Appl. No. 11/182,251, 23 pgs.
U.S. Official Action dated Mar. 13, 2009 cited in U.S. Appl. No. 11/182,251, 20 pgs.
U.S. Official Action dated May 14, 2009 cited in U.S. Appl. No. 11/182,989, 23 pgs.
U.S. Appl. No. 11/182,251, Amendment and Response filed Nov. 26, 2008, 12 pgs.
U.S. Appl. No. 11/182,251, Amendment and Response filed Nov. 30, 2010, 17 pgs.
U.S. Appl. No. 11/182,251, Amendment and Response filed Nov. 4, 2011, 17 pgs.
U.S. Appl. No. 11/182,251, Amendment and Response filed Apr. 26, 2010, 17 pgs.
U.S. Appl. No. 11/182,251, Amendment and Response filed Jun. 15, 2009, 14 pgs.
U.S. Appl. No. 11/182,251, Amendment and Response filed Sep. 14, 2009, 7 pgs.
U.S. Appl. No. 11/182,251, Office Action mailed Jan. 30, 2012, 24 pgs.
U.S. Appl. No. 11/182,251, Office Action mailed Nov. 6, 2008, 4 pgs.
U.S. Appl. No. 11/182,251, Office Action mailed Aug. 22, 2008, 7 pgs.
U.S. Appl. No. 11/182,251, Office Action mailed Aug. 4, 2011, 23 pgs.
U.S. Appl. No. 11/182,989, Amendment and Response filed Dec. 1, 2011, 13 pgs.
U.S. Appl. No. 11/182,989, Amendment and Response mailed Oct. 19, 2009, 6 pgs.
U.S. Appl. No. 11/182,989, Amendment and Response mailed Oct. 29, 2010, 14 pgs.
U.S. Appl. No. 11/182,989, Amendment and Response mailed Nov. 26, 2008, 12 pgs.
U.S. Appl. No. 11/182,989, Amendment and Response mailed May 3, 2010, 14 pgs.
U.S. Appl. No. 11/182,989, Amendment and Response mailed Aug. 14, 2009, 11 pgs.
U.S. Appl. No. 11/182,989, Office Action mailed Feb. 28, 2012, 20 pgs.
U.S. Appl. No. 11/182,989, Office Action mailed Sep. 1, 2011, 19 pgs.
U.S. Appl. No. 11/182,989, Office Action mailed Sep. 5, 2008, 6 pgs.
Vanwasi, "Unleashing the power of P2P"; Network Magazine India; Apr. 2002; 5 pgs.
Zhu, "The Simple and Protected Generic Security Service Application Program Interface (GSS-API) Negotiation Mechanism", RFC-4178, Oct. 2005, http://www.ietf.org/rfc/rfc4178.txt, 20 pgs.
U.S. Appl. No. 11/182,251, Amendment and Response filed May 30, 2012, 14 pgs.
U.S. Appl. No. 11/182,251, Notice of Allowance mailed Jul. 12, 2012, 8 pgs.
U.S. Appl. No. 11/182,989, Amendment and Response filed May 29, 2012, 11 pgs.
U.S. Appl. No. 11/182,989, Notice of Allowance mailed Jun. 21, 2012, 5 pgs.
Oehme, et al.,"IBM Scale out File Services: Reinventing network-attached storage", Retrieved at << http://www-935.ibm.com/services/us/its/pdf/sofs-am-journal-final-070108.pdf >>, vol. 52 No. 4/5 Jul./Sep. 2008, pp. 10.
Maiworm, Daniel, "Symantec Enterprise Vault", Retrieved at << http://www.cstl.com/products/Symantec/Symantec-Enterprise_Vault/File System Archiving.pdf >>, Feb. 5, 2007, pp. 35.
"NTFS Design Goals and Features", Retrieved at http://wininternals.uw.hu/ch12lev1sec4.html >>, Retrieved Date: Oct. 11, 2010, pp. 9.
PCT International Search Report and Written Opinion in International Application PCT/US2011/063618, mailed Jun. 28, 2012, 9 pgs.

(56) References Cited

OTHER PUBLICATIONS

U.S. Appl. No. 11/182,251, Amendment and Response filed Oct. 11, 2012, 2 pgs.
U.S. Appl. No. 13/663,827, Office Action mailed Jan. 29, 2013, 16 pgs.
U.S. Appl. No. 13/664,012, Office Action mailed Jan. 25, 2013, 19 pgs.
Almeida, "FIFS: A Framework for Implementing User-Mode File Systems in Windows NT", Proceedings of the 3rd USENIX Windows NT Symposium, Jul. 12-15, 1999, 19 pgs.
Chinese 4th Office Action in Application 200510127998.2, mailed Nov. 16, 2011, 7 pgs.
Chinese 5th Office Action in Application 200510127998.2, mailed Mar. 2, 2012, 8 pgs.
Chinese Notice of Allowance in Application 2005101279978.2, mailed Dec. 5, 2011, 4 pgs.
Chinese Notice of Allowance in Application 200510127998.2, mailed Aug. 20, 2012, 4 pgs.
Chinese Office Action dated Apr. 29, 2010 in Application No. 200510127997.8, 10 pgs.
Chinese Office Action dated Apr. 29, 2010 in Application No. 200510127998.2, 10 pgs.
Chinese Second Office Action dated Mar. 3, 2011 in Application No. 200510127998.2, 8 pgs.
Chinese Second Office Action dated Mar. 30, 2011 in Application No. 200510127997.8, 26 pgs.
Chinese Third Office Action dated Jul. 7, 2011 in Application No. 200510127998.2, 9 pgs.
Digital Equipment Corporation, RSX-11M/M-Plus RMS-11 User's Guide [online], Order No. AA-L669A-TC, Apr. 1983, [Retrieved Aug. 17, 2007], Retrieved from: http://www.computer.museum.uq.edu.au/RSX-11%20Manuals.html; 186 pgs.
European Exam Report in Application 05111885.9 mailed Sep. 13, 2007, 5 pgs.
European Invitation to Correct Defects in Application No. 08008916.2 mailed Sep. 4, 2008, 6 pgs.
European Notice of Allowance in Application 05111885.9 mailed Jun. 11, 2008, 6 pgs.
European Notice of Allowance in Application 080089162 mailed Jan. 24, 2011, 6 pgs.
European Notice to Grant in Application 05111885.9 mailed Oct. 9, 2008, 1 p.
European Search Report dated Feb. 1, 2011 in Application No. 10013021.0 , 9 pgs.
European Search Report dated Feb. 15, 2006 in Application No. 05111729.9, 193 pgs.
European Search Report dated Feb. 22, 2006 in Application No. 05111729.9, 8 pgs.
European Search Report dated Jan. 20, 2006 in Application No. RS113279/US18298905, 2 pgs.
European Search Report dated Jan. 20, 2006 in Application No. RS113280/US18225105, 4 pgs.
European Search Report dated Jan. 4, 2011 in Application No. 10012923.8, 9 pgs.
European Search Report dated Jun. 18, 2008 in Application No. 08008916.2,9 pgs.
European Search Report dated Sep. 19, 2006 in Application No. 055111885.9, 8 pgs.
Hertel, Implementing CIFS the Common Internet File System [online], [Retrieved Jul. 13, 2007], Retrieved from: http://ubiqx.org/cifs/; 3 pgs.
Hong Kong Certificate of Grant in Application 07105689.8 mailed Jun. 26, 2009, 2 pgs.
Indian First Exam Report in Application 3305/DE/L2005, mailed Mar. 28, 2013, 2 pgs.
Internet Assigned Numbers Authority, Well-Known Port Numbers, http://www.jana.org/assignments/port-numbers, 233 pgs.
Japanese Office Action in Application 200510127997.8 mailed Aug. 3, 2011, 8 pgs.
Japanese Office Notice of Allowance in Application 2006-307121 mailed Feb. 14, 2012, 6 pgs.
Japanese Office Notice of Rejection in Application 2006-307121 mailed Aug. 12, 2011, 5 pgs.
Japanese Office Notice of Rejection mailed Apr. 3, 2007 in Application No. 2005-356145, 6 pgs.
Japanese Office Notice of Rejection mailed Jan. 15, 2008 in Application No. 2005-356145, 5 pgs.
Japanese Office Notice of Rejection mailed Mar. 10, 2006 in Application No. 2005-356146, 5 pgs.
Japanese Office Notice of Rejection mailed May 12, 2006 in Application No. 2005-356145, 4 pgs.
Japanese Office Notice of Rejection mailed Nov. 10, 2006 in Application No. 2005-356146, 3 pgs.
Korean Notice of Preliminary Rejection mailed Jan. 21, 2011, Application No. 10-2007-80691, 8 pgs.
Korean Notice of Rejection mailed Nov. 17, 2006 in Application No. 10-2005-0124340, 5 pgs.
PCT International Search Report and Written Opinion in International Application PCT/US2012/041049, mailed Jan. 17, 2013, 12 pgs.
PCT International Search Report and Written Opinion in International Application PCT/US2012/054038, mailed Feb. 20, 2013, 10 pgs.
SMB: The Server Message Block Protocol [online], 1999, Retrieved from: http://ubiqx.org/cifs/SMB.html.
U.S. Appl. No. 13/172,757, Office Action mailed Apr. 19, 2013, 23 pgs.
U.S. Appl. No. 13/663,827, Amendment and Response filed Apr. 29, 2013, 10 pgs.
U.S. Appl. No. 13/664,012, Amendment and Response filed Apr. 24, 2013, 10 pgs.
U.S. Appl. No. 13/664,012, Office Action mailed Apr. 30, 2013, 16 pgs.
U.S. Appl. No. 13/663,827, Office Action mailed May 7, 2013, 16 pgs.
U.S. Appl. No. 13/228,732, Office Action mailed Jul. 8, 2013, 16 pgs.
U.S. Appl. No. 13/228,818, Office Action mailed Jul. 18, 2013, 18 pgs.
Chinese Notice of Entering into Substantive Examination in Application 201210331041.X, mailed Mar. 6, 2013, 3 pgs.
PCT International Search Report and Written Opinion in International Application PCT/US2012/041703, mailed Feb. 14, 2013, 13 pgs.
PCT International Search Report and Written Opinion in International Application PCT/US2012/054039, mailed Feb. 27, 2013, 11 pgs.
U.S. Appl. No. 13/228,818, Amendment and Response filed Oct. 18, 2013, 24 pgs.
U.S. Appl. No. 13/663,827, Amendment and Response filed Aug. 6, 2013, 7 pgs.
U.S. Appl. No. 13/663,827, Advisory Action mailed Aug. 22, 2013, 3 pgs.
U.S. Appl. No. 13/663,827, Amendment and Response filed Sep. 9, 2013, 8 pgs.
U.S. Appl. No. 13/663,827, Notice of Allowance mailed Sep. 26, 2013, 11 pgs.
U.S. Appl. No. 13/664,012, Amendment and Response filed Jul. 30, 2013, 12 pgs.
U.S. Appl. No. 13/664,012, Notice of Allowance mailed Sep. 12, 2013, 14 pgs.
U.S. Appl. No. 13/172,757, Amendment and Response filed Aug. 19, 2013, 14 pgs.
Chinese 1st Office Action in Application 201110329007.4, mailed Oct. 10, 2013, 13 pgs.

* cited by examiner

PROVIDING TRANSPARENT FAILOVER IN A FILE SYSTEM

BACKGROUND

A variety of techniques exists for sharing files, printers, and other resources between two computers on a network. For example, two application-layer network protocols for sharing resources are Server Message Block (SMB) and Network File System (NFS). SMB is used by MICROSOFT™ WINDOWS™ and other operating systems to allow two computers or other resources to communicate, request access to resources, specify intended access of resources (e.g., reading, writing, etc.), lock resources, and so on. MICROSOFT™ WINDOWS™ Vista introduced SMB 2.0, which simplified the command set of SMB 1.0 and added many other enhancements. MICROSOFT™ WINDOWS™ 7 and Server 2008 R2 introduced SMB 2.1, which added opportunistic locking (oplocks) and other enhancements.

Most protocols for remote sharing of resources assume a one-to-one relationship between connections and sessions. A session represents the lifetime of any single request to access a resource and the subsequent access of that resource until the connection is terminated. A session may also be associated with a particular security principal and validated security credentials that determine the actions that are authorized during the session. A connection can include a Transmission Control Protocol (TCP). User Datagram Protocol (UDP), or other type of connection over which higher-level protocols like SMB and NFS can communicate to carry out commands. An SMB or NFS session typically involves opening a TCP or UDP connection between a source of a request and a target of the request, sending one or more SMB or NFS commands to access the target resource, and then closing the session. Sometimes connections are lost during a session (e.g., due to a network failure), tearing down any client and server state established during the connection. To reestablish a connection the client and server typically have to repeat all of the steps used to initially establish the connection over again.

The SMB2 protocol provides a resume key that allows clients to quickly reestablish a file handle to a server if a client is disconnected from the server, enabling clients to reduce network round trips to the server and reduce the load on the server when a client reconnects. However, today the resume key does not provide restoration of state in the event of server failover in which the SMB2 server loses volatile state during a server reboot or failover of a cluster. State information associated with existing opens is lost and must be reestablished. In addition, the resume key is an application-level concept that can only be created and used within the boundary of an application but not shared.

SUMMARY

A connection state system is described herein that allows a client to resume a connection with a server or a different replacement server by remotely storing client state information in association with a resume key. The system provides a resume key filter operating at the server that facilitates the storing of volatile server state information. The state information can include information such as oplocks, leases granted to a client, and in-flight operations on a file handle. The resume key filter driver sits above the file system, which allows multiple file access protocols to use the filter, as well as permitting the filter to provide this functionality across multiple file systems. The system provides state information to the protocol, independent of the actual protocol. Upon a failover event, such as a server going down or losing connectivity to a client, the system can bring up another server or the same server and reestablish state for file handles held by various clients using the resume key filter. The filter enforces a blackout window on active files after failover that guarantees that the active file state can be consistently restored and that other clients do not step in to access the file in the interim. In the resume phase, the resume key is used to map existing pre-failover file handles to post-failover preserved file state stored by the resume key filter. Thus, the connection state system allows the same or another server to resume the state of a previous session with a client after a failover event with as little disruption as possible to clients.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
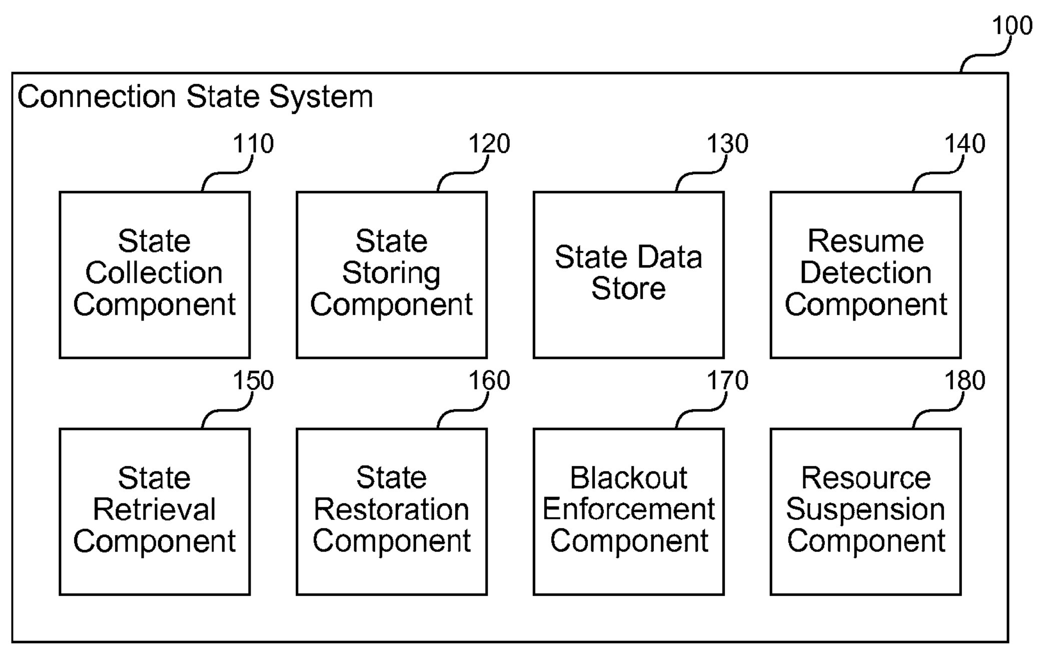
FIG. 1 is a block diagram that illustrates components of the connection state system, in one embodiment.

A connection state system is described herein that allows a client to resume a connection with a server or a different replacement server by remotely storing client state information in association with a resume key. The system provides a resume key filter operating at the server that facilitates the storing of volatile server state information. The state information can include information such as oplocks, leases granted to a client, and in-flight operations on a file handle. The resume key filter driver sits above the file system, which allows multiple file access protocols to use the filter, as well as permitting the filter to provide this functionality across multiple file systems. The system provides state information to the protocol, independent of the actual protocol. Upon a failover event, such as a server going down or losing connectivity to a client, the system can bring up another server or the same server (e.g., via different connection, such as a redundant Ethernet connection) and reestablish state for file handles held by various clients using the resume key filter.

The system provides a resume key filter that can be used for transparent failover after a server loses its connection to a client. The resume key filter sits atop the file system and is therefore independent of protocol used to access the file system. The resume key filter records active file state and than restores the active file state after a failover. The resume key filter can capture a variety of state information. For example, the filter records the active file system state comprising open handles (statically referenced by a resume key), uncommitted file state (such as delete on close, delete pending, and lock state), and certain in-flight/interrupted file operations. The filter restores the active file system state after failover such that the open handles are resumed to match those prior to failover and in-flight operations can be consistently replayed. The filter provides a means for multiple Remote File Systems (RFS) to store and retrieve private opaque data that is associated with an open file handle referenced through a resume key. The filter enforces a blackout window on active files after failover that guarantees that the active file state can be consistently restored and that other clients do not step in to access the file in the interim. The filter also allows a currently active file to be "suspended" and then resumed without a failover in order to support SMB in the cluster scenario where nodes failover.

A remote file system (RFS) supplies a resume key with every file create operation as an extra parameter during create. The key is unique to the RFS. The resume key filter uses a resume key and an RFS identification key together as a globally unique identifier (GUID) for a file handle. In the resume phase, the resume key is used to map existing pre-failover file handles to post-failover preserved file state stored by the resume key filter. Thus, the connection state system allows the same or another server to resume the state of a previous session with a client after a failover event with as little disruption as possible to clients.

FIG. 1 is a block diagram that illustrates components of the connection state system, in one embodiment. The system 100 includes a state collection component 110, a state storing component 120, a state data store 130, a resume detection component 140, a state retrieval component 150, a state restoration component 160, a blackout enforcement component 170, and a resource suspension component 180. Each of these components is described in further detail herein.

The state collection component 110 creates a state record for each file handle and collects state information as a client request operations using the file handle. The component 110 may operate at a server and store state information externally from the server so that the state information can be accessed if the server is unavailable. For example, the component 110 may store the state information the state data store 130 described further herein. The state collection component 110 may receive a resume key from the client when the client connects to the server, and the component 110 associates collected state information with the resume key in the state data store 130. If a client is reconnecting after a failover event, the client will provide the same resume key used to open the initial connection and the current server can find the state information stored by the previous server and recreate the server state from the state information.

The state storing component 120 stores collected state information in association with a resume key provided by the client. The component 120 stores the state information in the state data store 130 and keeps a record of operations related to the resume key that would be restored in the event of a failover event. The state information may include open file handles, oplocks granted, leases and lease information, in-progress file operations, byte range locks, and any other information that another server would use to carry out the client's requests without the client reestablishing all of the previous state.

The state data store 130 persistently stores file system state information that a resuming server uses to recreate state information stored by a failing server. In some cases, the resuming server and the failing server may be the same server using a different connection to the client or coming back up after a brief outage. In other cases, the resuming server and failing server are different servers, and the state data store 130 is provided in a location accessible to both servers for sharing the state information. The state data store 130 may include one or more files, file systems, hard drives, databases, storage area networks (SANs), cloud-based storage services, or other storage facility for persistently storing data and accessible to both the failing and resuming server for exchanging information. As the failing server is performing operations, it is storing state information about the operations' progress in the state data store 130. Upon a failure, the failing server will be interrupted, and a resuming server accesses the state information to resume the state and continue carrying out any operations that did not complete.

The resume detection component 140 detects a condition that makes a failing server unavailable and informs a resuming server to act in the failing server's place. The detection may be client driven, such that the system does not perform any resuming steps until the client reconnects to the system and provides a previously used resume key. The system identifies the key and any state information stored in association with the key and restores that state information as part of setting up the connection. The resuming server may be the same or a different server from the failing server, and the resume detection component 140 ensures that the resuming server becomes active to handle the client's requests. In other embodiments, the detection may be server driven and the system may proactively bring up a resuming server upon detecting that a failing server has gone down. The system may also prepopulate the resuming server with stored state information even before a client requests a connection to the server.

The state retrieval component 150 retrieves stored state information from a location accessible to the resuming server, wherein the state information allows the resuming server to resume any previously requested file system operations that were interrupted by the detected failure condition. The state retrieval component 150 retrieves state information from the state data store 130 and invokes the state restoration component 160 to load the information into the resuming server so that the resuming server can continue the operations requested by the client.

The state restoration component 160 loads the retrieved state information into the resuming server so that the resuming server can continue operations previously requested by the client. The restoration may also include refreshing any oplocks and/or leases held by the client to ensure that other clients abide by previously requested access levels and/or exclusivity granted to the client. The state restoration component 160 allows a new server or node to take the place of a failing server or node without placing a heavy burden upon the client to restore state information by repeating past operations. Clients using protocols like SMB 2.0 already know how to use a resume key to restore a connection to the same server, and the connection state system allows a substitute server to take the place of a failing server transparently to the client. Resume keys can also be used with NFS. In the case of NFS, the concept of a resume key is completely opaque to the client. The client does not explicitly refer to or participate in resume key generation, management, and association. Rather, the resume key is a server side concept.

The blackout enforcement component 170 enforces a blackout period on access to one or more files or other resources that prevents a second client from interfering with resources in a way that would conflict with a first client resuming a connection to the resuming server. The component 170 may automatically select a period deemed to be long enough to avoid most conflicting operations (e.g., 15 or 30 seconds), but not so long as to prevent other clients from accessing resources if the first client does not resume the connection. The period allows the first client time to resume the connection if the first client chooses. In some embodiments, the system allows an administrator or other user to configure the duration of the blackout period to tune the system for application-specific purposes. The system may also allow individual clients to request a blackout period as a parameter to a create/open request or other application programming interface (API). In response to attempts to access a blacked out resource, the component 170 may provide an indication to try again after a particular period or simply fail the request. After the blackout period if no client has resumed the connection, then the blackout is over and requests to access the resource will succeed as normal.

The resource suspension component 180 allows a currently active resource to be suspended and resumed without a failover event to allow a cluster to failover to another node in planned manner. One example is load balancing. Suspending allows scenarios where a subset of the state is being transitioned to a new node. For example, if one node in the cluster is overloaded, an administrator may want to migrate half the node's clients to a new node. Suspending allows capturing the state of the opens that are being migrated and allows the client to connect to the new node as a continuation of the same open (e.g., without reestablishing server state). As another example, SMB supports clustering scenarios in which generic nodes are brought into a cluster and can be used interchangeably to service client requests. Sometimes there is a reason to bring down a particular node, such as for maintenance, and it is desirable to cleanly suspend the current node, activate the new node, deactivate the old node, and then perform any maintenance operations on the deactivated node. This can have an undesirable impact on clients, but using the techniques described herein, the system 100 can suspend the node in an organized manner, and allow clients to resume operations with the new node efficiently.

The computing device on which the connection state system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
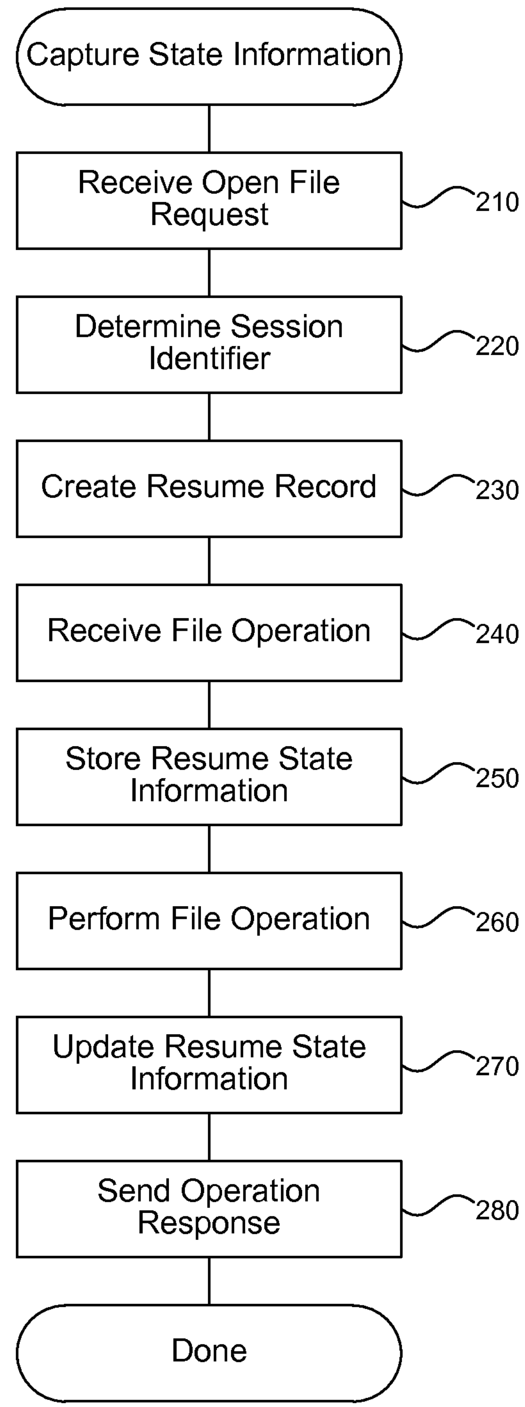
FIG. 2 is a flow diagram that illustrates processing of the connection state system to capture file system state information, in one embodiment.

FIG. 2 is a flow diagram that illustrates processing of the connection state system to capture file system state information, in one embodiment. Beginning in block 210, the system receives from a client a request to access a remote resource stored on a server. The access request may include one or more parameters, including a resume key used to identify the session across multiple potential connections if a connection fails. The resource access request may be the first in a series of access requests sent from the client, and if the client is ever disconnected from the server the client may provide the same resume key in a subsequent open request to the same or a new server to resume the connection. The resume key helps the server respond to the client faster by correlating state information maintained by the server (or across servers) between what would otherwise appear to be independent client connections.

Continuing in block 220, the system determines an identifier that identifies a client session related to the request. The identifier in some cases is a resume key that the client provides for durable handles that allow resuming sessions that get disconnected for various reasons. The access request may include one or more parameters at well-defined locations in the protocol so that the system can extract the key by reading the appropriate location in the request. Alternatively or additionally, the server may include an automated process for determining the identifier that does not involve information explicitly provided by the client. For example, the server may identify the client by Internet Protocol (IP) address or other inferred data that indicates to the server that the client connection is correlated with a previous session.

Continuing in block 230, the system creates a resume record searchable by the extracted identifier that associates state information created by operations requested by the client with the extracted identifier. The resume record can be stored at a location external to the server handling the present access request so that if the server fails another server will be able to read the record to resume the operations and act in the original server's place. The resume record may include a file, database record, or other form of storage. The record may contain a list of open file handles, oplocks obtained by the client, leases, or other file system state information.

Continuing in block 240, the system receives a file operation from the client that requests access to a file accessible through the server. The file operation may be a request to open a file, close a file, read a file, write a file, print to a shared printer, or other file system operations. The received operation involves a certain amount of state information being created on the server. For example, if the client opens a handle to the file, then the server tracks that handle to manage other client requests related to the file and to manage lifetime and/or cleanup processing for the handle.

Continuing in block 250, the system stores resume state information in the created resume record that provides information to resume the received file operation if the client loses its connection with the server. If the client connection fails, the client will attempt to resume the connection by again opening a remote resource and specifying the same resume key or other session identifier. This will allow the server or another server to access the stored resume record and reestablish the previous state information.

Continuing in block 260, the system performs the requested file operation. The operation may open a file, read the contents of the file, write data to the file, change access rights to the file, or any other file system operation. The outcome of the operation may change the state stored by the server. For example, if the client attempts to close a handle and the server successfully closes the handle, then the server state will be updated to remove the handle from a list of handles tracked by the server.

Continuing in block 270, the system updates the stored resume state information in the created resume record based on an outcome of the performed file operation. The system cannot know in advance when a failure will occur that causes failover, so the system keeps an up to date view of the server state in the resume record that allows a server to reestablish the state as close to the previous server's state as possible. Operations that were not completed may be replayed to complete the operations while operations that did complete will not need to be repeated (but the server may resend the result to the client). Thus, the system updates the state as needed during and after various file system operations that change server state information.

Continuing in block 280, the system sends a response to the client that indicates the outcome of the requested file operation. If the client and server are still connected, then operations continue as they are requested by the client and the server continues to track updated state information. If at any time the connection is lost, another server can be brought up or the existing server repaired and the state information can be loaded from the state store to reestablish the prior server state. Upon receiving a new request from the client to resume the session, the client need not be aware that failover has occurred and that the client is potentially interacting with a different server than the original one. After block 280, these steps conclude.

Figure 3:
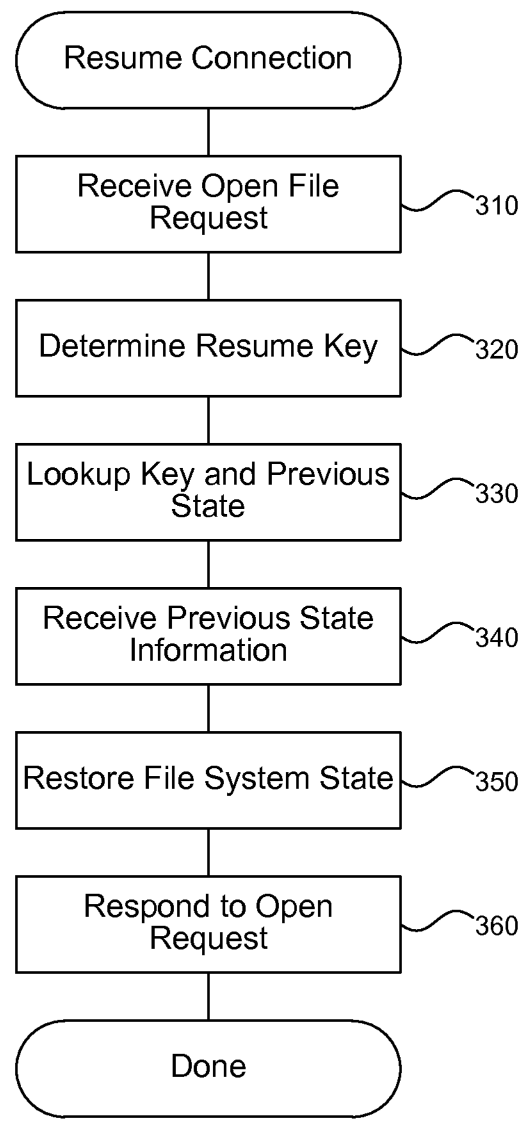
FIG. 3 is a flow diagram that illustrates processing of the connection state system to resume a connection after failover, in one embodiment.

FIG. 3 is a flow diagram that illustrates processing of the connection state system to resume a connection after failover, in one embodiment. Beginning in block 310, the system receives from a client a request to open a remote resource stored on a server. The access request may include one or more parameters, including a resume key used to identify the session across multiple potential connections if a connection fails. Unlike the resource access request discussed with reference to FIG. 2, this request is a request to reconnect to a previously connected session. The client provides the same resume key as originally provided, so that the server can correlate the current session request with the previous session.

Continuing in block 320, the system determines a session identifier that identifies a client session related to the request. The identifier in some cases is an SMB 2 resume key that the client provides for durable handles that allow resuming sessions that get disconnected for various reasons. The access request may include one or more parameters at well-defined locations in the protocol so that the system can extract the key by reading the appropriate location in the request. In other cases, the server may determine the identifier automatically based on information about the client.

Continuing in block 330, the system looks up the received session identifier in a state store to identify a resume record associated with the session identifier. Any previous server interacting with the client using a resumable session stores state information on an ongoing basis throughout interaction with the client. When the client attempts to reestablish the connection, the state information is available to a failover server standing in for the original server. The state information may be stored externally to the original server so that the information is accessible after a failure of the original server.

Continuing in block 340, the system receives from the state store previous state information associated with the resume record. The state information identifies static state, such as open file handles, obtained leases, obtained oplocks, and so forth, as well as dynamic state, such as in-flight operations that may not have completed. The stored state information allows the failover server to take the place of the original server without specific processing by the client. The client understands resumable handles and performs steps to make a connection resumable, but may not be aware of which server ends up handling the connection at any particular time. The client may access the server via a domain name or network file share that can resolve to an address of any one of several servers, including the failover server.

Continuing in block 350, the system restores the received previous state information by loading the information into the file system components that track file system state. After loading the state, the local state of the failover server is similar to how the state would look if all of the previous operations had occurred on the failover server. Thus, the failover server is as useful to the client for continuing the series of operations as the original server would have been had the connection not failed.

Continuing in block 360, the system responds to the client access request indicating that the server found the resume record and is ready to receive client operations related to the previous session. Based on the server's response, the client can determine whether the session is resumed or whether the client needs to take steps to repeat previous operations. If the session was successfully resumed, then the client can continue knowing the previous operations completed or were replayed to complete after the server resumed. In some cases, the system may hand the client a new file handle that has the same state as the pre-failover file handle. After block 360, these steps conclude.

Figure 4:
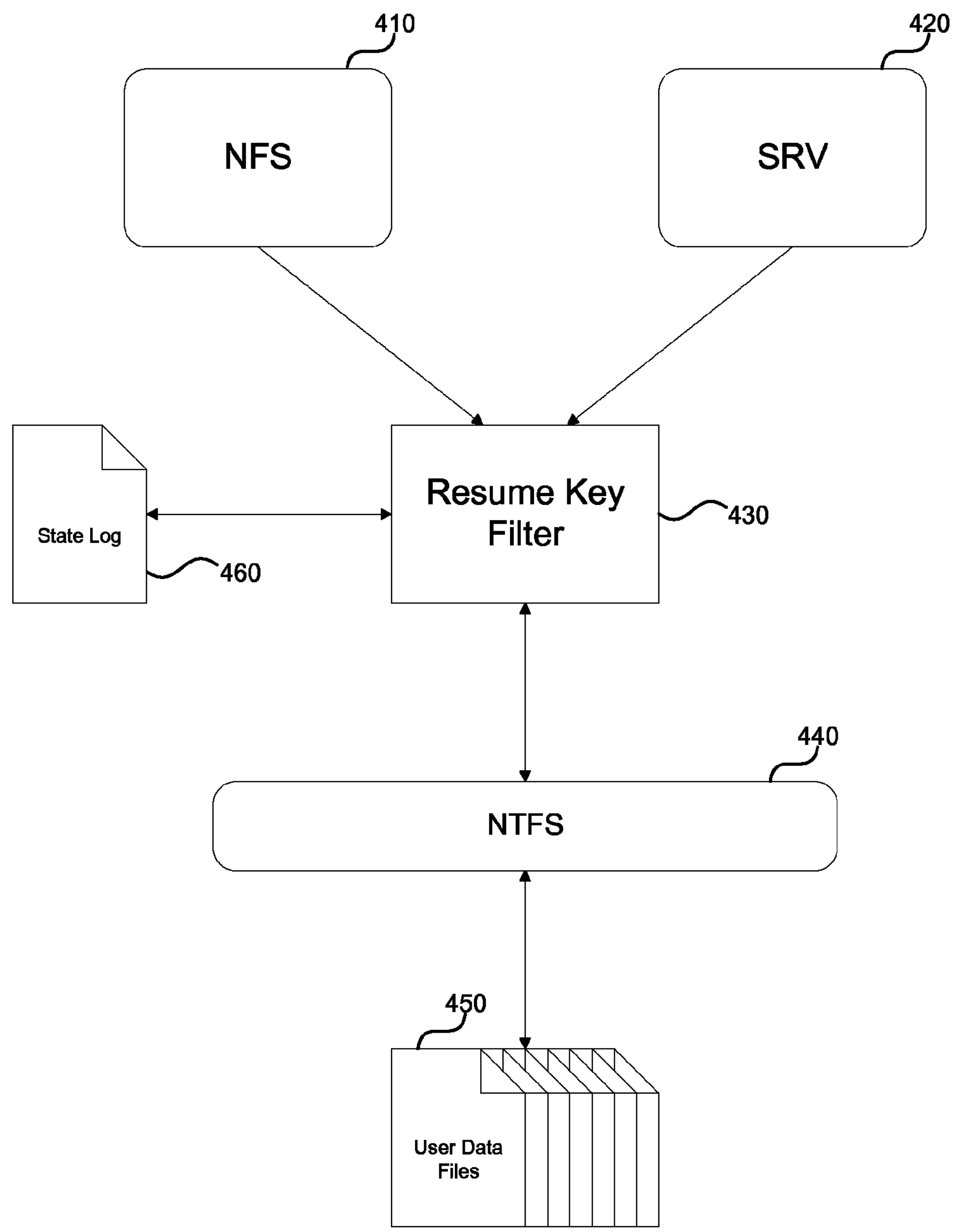
FIG. 4 is a block diagram that illustrates the operating environment of the connection state system, in one embodiment.

FIG. 4 is a block diagram that illustrates the operating environment of the connection state system, in one embodiment. The environment includes one or more operating system services or applications that interact with file systems. For example, MICROSOFT™ WINDOWS™ includes a server service 420 known as SRV, and a network file system service 410 known as NFS. The network file system service 410 and server service 420 provides access to shared resources, such as files and printers, between computer systems. The server service 420 uses the SMB protocol common to WINDOWS™ networks, while the network file system service 410 provides access to Unix-based systems that more commonly use NFS. Regardless of the protocol, the resume key filter 430 captures file operations and stores state information for resuming the operations in a remote data store. The operations pass through the file system level 440 (e.g., NTFS or other file system), and affect one or more user data files 450. Meanwhile, the resume key filter 430 writes state information to a log file 460 or other data store, that another server can access to retrieve state information and resume a connection to a client. The system can operate independent of the particular protocol or file system involved, and various components can be updated to save their own particular state information in the state data store.

In some embodiments, the connection state system stores opaque blobs of data on behalf of file system components to allow the system to resume connections without component-specific knowledge. For example, the resume key filter described herein can ask the server service for any data the server service would need to recreate its present state. The filter can then store any received data as an opaque blob (i.e., the filter need not know what is in the blob or its semantic meaning) in the state store. Upon a failover condition, a resume key filter operating on the new server can access the stored state information, retrieve the stored blob, and provide the blob to the server service so that the server service can restore its own state. In this way, the system can be made to work with many types of protocols without specific knowledge of the internal operations of components that implement each protocol for a server.

In some embodiments, the connection state system blocks other clients from accessing files or other resources related to a resumable handle for some amount of time (i.e., blackout period). If the original client reconnects during the blackout period, then the original client gets its connection back with all of the previous state, and can resume operations. If another client attempts to connect, the server may provide a message indicating to wait an amount of time and retry. Resume aware clients can use this information to delay retrying until after the blackout period, while older clients may simple fail the connection and manually retry at the user's request. If the original client does not return within the blackout period, the server cleans up the resume state information and allows new clients to access the resources as usual.

In some embodiments, the connection state system can use a variety of storage devices or strategies for speeding up resumes. For example, the system may use a fast, nonvolatile storage device (e.g., a solid state disk (SSD)) for storing resume state information so that resumes get faster access to data to avoid delaying operations already interrupted by a failure any further. As another example, the system may broadcast all changes made by each server to a group of servers, so that each server can maintain its own copy of the state information and can be the elected failover server in the event of a failure of the original server.

From the foregoing, it will be appreciated that specific embodiments of the connection state system have been described herein for purposes of illustration, but that various modifications may be made without deviating from the spirit and scope of the invention. Accordingly, the invention is not limited except as by the appended claims.

We claim:

1. A computer-implemented method for capturing file system state information to facilitate resuming connections, the method comprising:

receiving, from a first client, a request to access a remote resource stored on a server;

determining an identifier that identifies a client session related to the request;

creating a resume record, wherein the resume record is searchable by the identifier and wherein the resume record associates state information created by operations requested by the first client with the identifier;

receiving a file operation from the first client, wherein the file operation requests access to a file accessible through the server;

storing resume state information in the resume record, wherein the resume state information provides information to resume the received file operation if the first client loses the connection with the server;

upon the first client losing the connection with the server, loading, at a failover server, the resume record to enable the first client to connect to the failover server and continue the file operation, wherein access to the remote resource is restricted for a period of time to prevent a second client from interacting with the remote resource in a manner that conflicts with the first client establishing a connection to the failover server;

performing the requested file operation;

updating the resume state information in the resume record based on an outcome of the file operation; and sending a response to the first client that indicates the outcome of the requested file operation.

2. The method of claim 1 wherein the access request includes one or more parameters, including a resume key that identifies the client session across multiple potential connections if a connection fails, and wherein the resume key is at least part of the determined identifier.

3. The method of claim 1 further comprising, upon the first client becoming disconnected from the server, receiving at the failover server a new access request that the failover server can correlate with the original access request to help the failover server respond to the first client after a connection failure by correlating state information maintained by the server between multiple client connections.

4. The method of claim 1 wherein a Network File System (NFS) server determines the identifier automatically without receiving a resume key from the first client.

5. The method of claim 1 wherein the identifier is a Server Message Block (SMB) resume key that the first client provides for durable handles that enable disconnected sessions to be resumed.

6. The method of claim 1 wherein creating the resume record comprises storing the resume record at a location external to the server handling the request to access the remote resource stored on the server.

7. The method of claim 1 where receiving the file operation comprises a request to perform an operation selected from the group consisting of opening a file, closing a file, reading a file, writing a file, obtaining a lease on a file, and obtaining a lock on a file.

8. The method of claim 1 wherein performing the requested file operation modifies a state stored by the server, and wherein updating the resume state information captures the modified state.

9. The method of claim 1 wherein updating the resume state information comprises keeping an up to date view of the server state in the resume record that allows another server to reestablish the state and handle client requests in place of the original server without requiring the first client to reestablish at least some of the state information.

10. A computer system for providing transparent failover for clients in a file system, the system comprising:

a processor and memory configured to execute software instructions embodied within the following components:

a state collection component that creates a state record for each file handle and collects state information as a first client requests operations using the file handle;

a state storing component that stores collected state information in association with a session identifier provided by the first client;

a state data store that persistently stores file system state information that a resuming server uses to recreate state information stored by a failing server;

a resume detection component that detects a condition that makes a failing server unavailable and informs a resuming server to act in the failing server's place;

a state retrieval component that retrieves stored state information from a location accessible to the resuming server, wherein the state information allows the resuming server to resume any previously requested file system operations that were interrupted by the detected failure condition;

a blackout enforcement component that enforces a blackout period on access to one or more files or other resources to prevent a second client from interfering with the one or more files or other resources in a manner that conflicts with the first client establishing a connection to the resuming server; and a state restoration component that loads the retrieved state information into the resuming server so that the resuming server can continue operations previously requested by the first client.

11. The system of claim 10 wherein the state collection component is further configured to operate at a server and store state information externally from the server so that the state information can be accessed if the server is unavailable.

12. The system of claim 10 wherein the state collection component is further configured to receive a resume key from the first client when the first client connects to the server, and associate collected state information with the resume key in the state data store.

13. The system of claim 10 wherein the state data store stores and provides information for the resuming server, wherein the resuming server is the same server as the failing server using a different connection to the first client.

14. The system of claim 10 wherein the state data store receives state information as the failing server is performing operations, and, upon a failure, provides access to the previously received state information to the resuming server to resume the state and continue carrying out any operations that were not completed.

15. The system of claim 10 wherein the condition detected by the resume detection component is the first client connecting with a session identifier previously stored in the state data store.

16. The system of claim 10 wherein the state restoration component provides at least one data blob to an external component that manages a file system or protocol, wherein the data blob is stored in the state data store on behalf of the external component for use during a resume operation.

17. The system of claim 10 further comprising a resource suspension component that allows a currently active resource to be suspended and resumed without a failover event to allow a cluster to failover to another node in planned manner.

18. A computer-readable storage medium encoding computer executable instructions which when executed by a processor performs a method, the method comprising:

receiving, from a first client, a request to access a remote resource stored on a server;

determining an identifier that identifies a client session related to the request;

creating a resume record, wherein the resume record is searchable by the identifier and wherein the resume record associates state information created by operations requested by the first client with the identifier;

receiving a file operation from the first client, wherein the file operation requests access to a file accessible through the server;

storing resume state information in the resume record, wherein the resume state information provides information to resume the received file operation if the first client loses the connection with the server;

upon the first client losing the connection with the server, loading, at a failover server, the resume record to enable the first client to connect to the failover server and continue the file operation, wherein access to the remote resource is restricted for a period of time to prevent a second client from interacting with the remote resource in a manner that conflicts with the first client establishing a connection to the failover server.

19. The computer-readable storage medium of claim 18 further comprising instructions for:

upon establishing a connection to the failover server:

performing the requested file operation;

updating the resume state information in the resume record based on an outcome of the file operation; and sending a response to the first client that indicates the outcome of the requested file operation.

20. The computer-readable storage medium of claim 18 wherein the identifier is a Server Message Block (SMB) resume key.

* * * * *